F. D. SAYLOR.
INSULATING JOINT.
APPLICATION FILED SEPT. 9, 1914.

1,231,202.

Patented June 26, 1917.
2 SHEETS—SHEET 1.

WITNESSES

INVENTOR
Frank D. Saylor
by his attorney

F. D. SAYLOR.
INSULATING JOINT.
APPLICATION FILED SEPT. 9, 1914.

1,231,202.

Patented June 26, 1917.
2 SHEETS—SHEET 2.

WITNESSES

INVENTOR
Frank D. Saylor
his attorney

UNITED STATES PATENT OFFICE.

FRANK D. SAYLOR, OF PITTSBURGH, PENNSYLVANIA.

INSULATING-JOINT.

1,231,202.  Specification of Letters Patent.  Patented June 26, 1917.

Application filed September 9, 1914. Serial No. 860,886.

*To all whom it may concern:*

Be it known that I, FRANK D. SAYLOR, a citizen of the United States, residing at Pittsburgh, in the county of Allegheny and State of Pennsylvania, have invented certain new and useful Improvements in Insulating-Joints, of which the following is a specification.

My invention consists of an improvement in insulating joints for fixtures, chandeliers or the like, and is particularly adapted to provide a fixture for supporting either electric or gas lamps, or both.

The particular object in view is to provide, in a fixture of such type, a strong, rigid, insulating joint construction in which the ends of pipe conduits may be connected by screw joints, so as to provide for gas circulation when desired, and a positive insulation against ground circuits or other electrical connection.

The improvement comprises, in such a joint, a metal bushing for each of the pipes, having threaded connection therewith, an intervening and outer surrounding insulating body fixedly holding the several parts in position, and an outermost reinforcing and protecting shell or coping, the several parts being arranged and adapted for threaded adjustment and tightening, and adapted to carry out the objects in view, as hereinafter more fully described.

In the drawings, which show preferred forms of the invention,—

Figure 1:
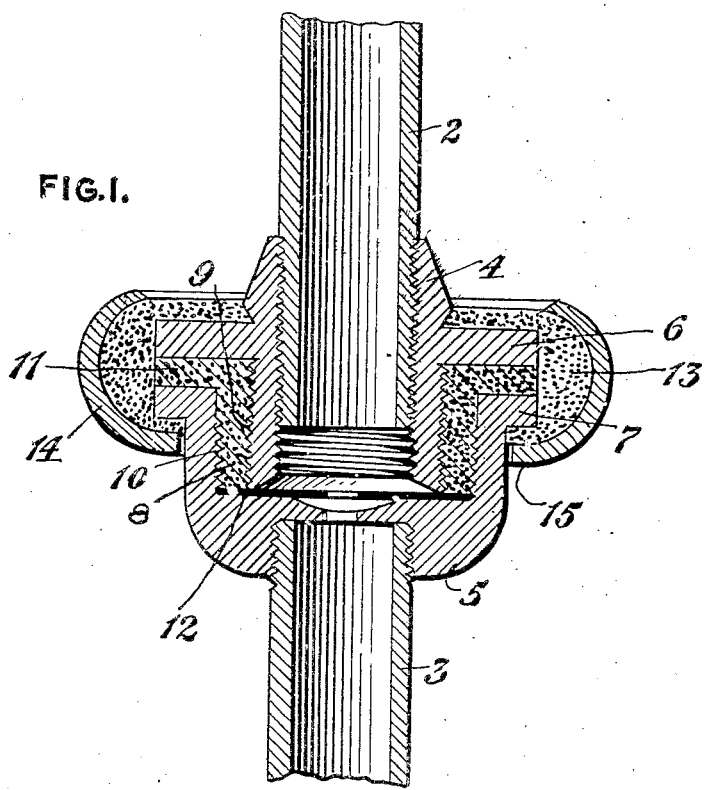
Figure 1 is a vertical sectional view through one form of joint, indicated by the section line II. II. of Fig. 2.
Figure 2:
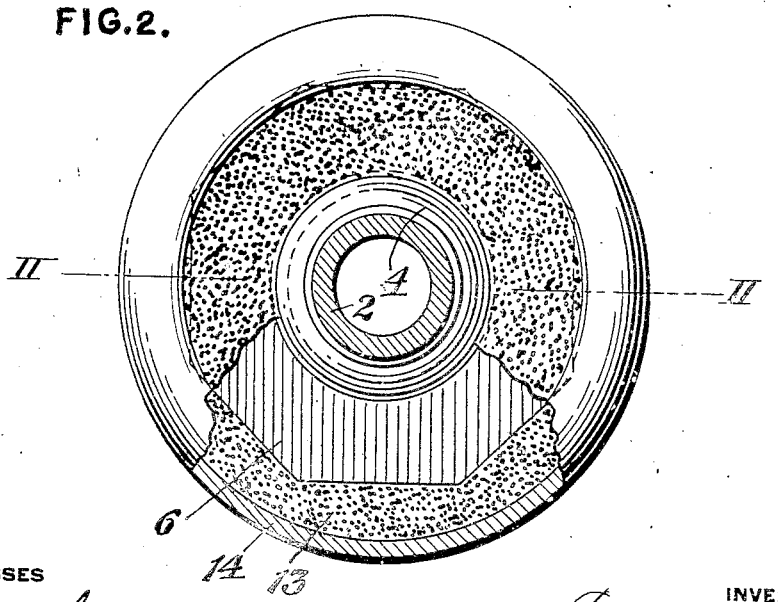
Fig. 2 is a plan view of Fig. 1, partly broken away at one side.

Referring to the construction of Figs. 1 and 2, the pipes 2 and 3, which serve as the main supporting members of the fixture, and as conduits for the gas, when used, are each provided with innermost threaded terminals, as shown. Pipe 2 is tapped into a bushing 4, and pipe 3 into a similar bushing 5, each of which is provided with confronting flanges 6, 7, respectively.

These flanges are preferably polygonal in form, as octagonal, for the purpose of turning them by a suitable wrench to the desired degree, so as to effect alinement of the several polygonal edges of the flanges, and of the intervening insulating body. Said body, indicated by the numeral 8, intervenes between the telescoping portions of bushings 4 and 5, as shown, each of which has threaded engagement with the insulating body 8, as at 9 and 10 respectively.

The insulating body 8 is also provided with a flange 11, preferably polygonal, corresponding to flanges 6 and 7, between which it is tightly gripped. Body 8 is of any suitable insulating material as "condensite" or the like, sufficiently hard and strong to be tapped and to effect substantial threaded connection between the connected bushings 4 and 5.

Between the said bushings is inserted a washer 12 of mica or other suitable insulating material, positively separating electrically the two bushings, in addition to the insulating bushing or body 8. Said washer is provided with a central opening for circulation of gas, which may be provided originally or punctured as needed.

For the purpose of fixedly clamping the several parts in position, I employ a surrounding sealing body or ring 13 of insulating material, as "condensite," which is pressed or molded within an outermost surrounding protecting ring or housing 14.

Said ring, as shown, engages by one of its end portions 15, outwardly around the flange 7 of bushing 5, and is rounded upwardly and outwardly beyond the flanges 6 and 11, as shown, the insulating material 13 being inserted between the ring or casing 14 and the several flanges, completely covering and protecting these parts, with the ring, and effectually insulating them from exterior contact.

Figure 3:
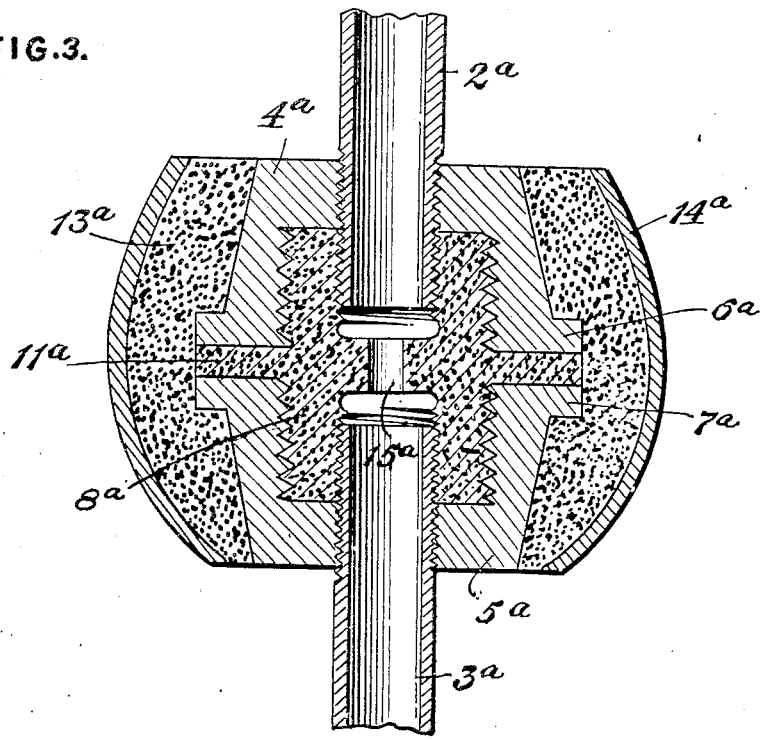
Figs. 3 and 4 are views similar to Fig. 1, showing modified constructions.

In Fig. 3, the bushings $4^a$ and $5^a$ are similarly provided with interior threaded terminals for the pipes $2^a$ and $3^a$, and also with the flanges $6^a$ and $7^a$, of polygonal form, as described.

Between these bushings is embraced the insulating bushing $8^a$ having the central flange $11^a$ and the oppositely extending threaded terminals for engagement with the bushings $4^a$ and $5^a$ exteriorly, and the pipes $2^a$ and $3^a$ interiorly, as shown.

The central portion of the bushing $8^a$ is preferably provided with a perforated opening $15^a$, as shown, for circulation of gas, as described, or such an opening may be bored when needed.

Surrounding the several bushings and their flanges is the body of insulating material $13^a$, within the outermost protecting and inclosing ring 14ª, of partly spherical form, as shown, whereby to completely inclose the insulating material and protect the several parts in the same manner as above described.

Figure 4:
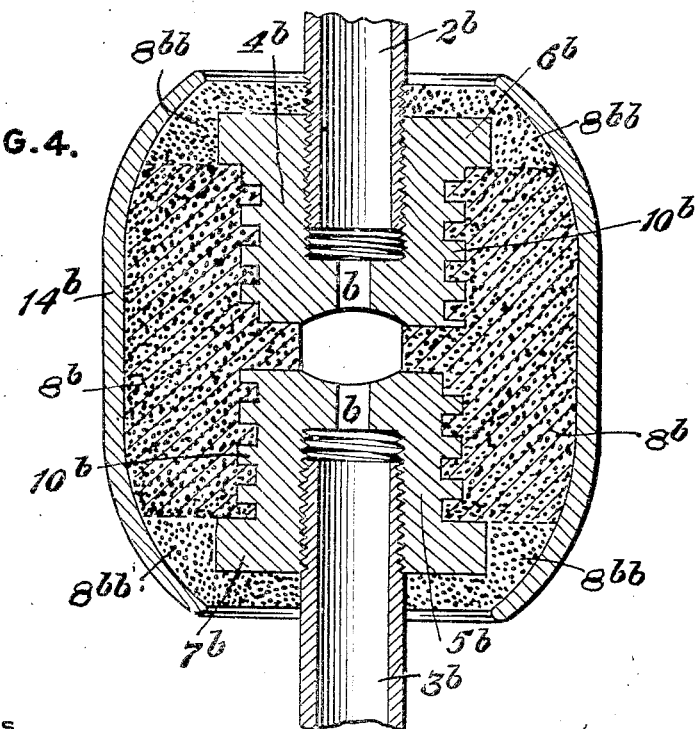

In Fig. 4 the pipes 2ᵇ and 3ᵇ are screwed into bushings 4ᵇ and 5ᵇ, which in turn have threaded engagement, as at 10ᵇ, with the surrounding and intervening bushing 8ᵇ of "condensite" or other suitable insulating material. In such construction, the bushings 4ᵇ and 5ᵇ being spaced apart, and separated by the insulating material 8ᵇ, as shown, there is no necessity for the supplemental mica washer 12 of Fig. 1. Bushings 4ᵇ and 5ᵇ are provided with polygonal flanges 6ᵇ and 7ᵇ for turning by a wrench, and each bushing is preferably centrally apertured, as at $b$, for circulation.

An outermost protecting shell 14ᵇ embraces the insulating body 8ᵇ, additional insulation 8ᵇᵇ being also inserted within the terminals of the shell and engaging and surrounding the flanges 6ᵇ, 7ᵇ, fixedly holding them against movement.

With either construction it will be seen that I provide for screw engagement between the pipes, their bushings, and the associated body of insulating material. This is of especial advantage in assembling the fixture and in insuring tight, firm connection of the several parts, also facilitating connection and disconnection of the pipes.

Also, in each, the connected parts are surrounded or embraced by the insulating material and the outer rounded shell, firmly and positively engaging and holding the polygonal flanges against displacement, and providing a complete outer protecting insulation and armor.

The device may be variously changed or modified in construction, design or various details by the skilled mechanic, but all such changes are to be considered as within the scope of the following claims.

What I claim is:

1. An insulating coupling consisting of a plurality of threaded metallic bushings in tandem each having a central threaded opening providing for a pipe connection at each end of the coupling and each bushing having an external flange, an intervening insulating member having threaded engagement with said bushings, and an outer insulating body.

2. An insulating coupling consisting of a plurality of threaded metallic bushings in tandem providing for a pipe connection at each end and each having a polygonal flange, an intervening insulating member having threaded engagement therewith, an outer insulating body, and a surrounding shell.

3. An insulating coupling consisting of a plurality of threaded metallic bushings in tandem providing for a pipe connection at each end and having flanged portions, an intervening insulating member having threads engaging the metallic bushings, and an outer insulating body enveloping said flange portions.

4. An insulating coupling consisting of a plurality of threaded metallic bushings in tandem providing for a pipe connection at each end and having flanged portions, an intervening insulating member connecting the metallic bushings by threaded engagement and extending therebeyond by an outer insulating body portion embracing said flanged portions, and an outermost rounded protecting casing embracing the extended portion of the insulating member.

5. In an insulating coupling of the class described, the combination of a plurality of spaced threaded bushings in tandem having terminal flanges, and a body of insulating material having threaded engagement with said bushings and embracing the flanges thereof.

6. In an insulating coupling of the class described, the combination of a plurality of spaced threaded bushings in tandem having terminal polygonal flanges, and a body of insulating material having threaded engagement with said bushings and embracing the flanges thereof.

7. In an insulating coupling of the class described, the combination of a plurality of spaced threaded bushings in tandem having terminal flanges, a body of insulating material having threaded engagement with said bushings and embracing said flanges, and an outer shell inclosing the insulating material and having inwardly deflected terminals surrounding the flanges and the insulating material therearound.

In testimony whereof I hereunto affix my signature in the presence of two witnesses.

FRANK D. SAYLOR.

Witnesses:
T. B. HUMPHRIES,
C. M. CLARKE.